Feb. 15, 1927. 1,617,531
G. W. MacKENZIE
LIQUID DISPENSING APPARATUS
Filed Oct. 17, 1925
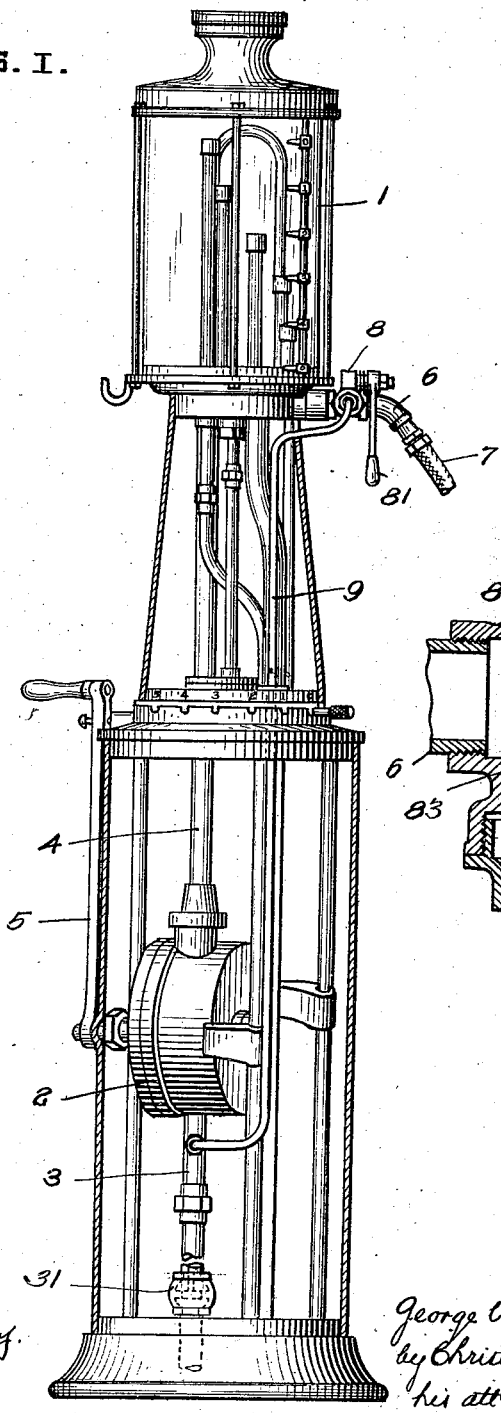
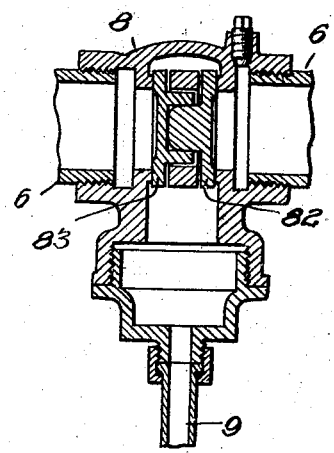
INVENTOR
George W. MacKenzie
by Christy and Christy
his attorneys
WITNESSES
J. Herbert Bradley
Percy A. English Patented Feb. 15, 1927.

1,617,531

UNITED STATES PATENT OFFICE.

GEORGE W. MacKENZIE, OF BEAVER, PENNSYLVANIA, ASSIGNOR TO CORRECT MEASURE COMPANY, OF ROCHESTER, PENNSYLVANIA, A CORPORATION OF PENNSYLVANIA.

LIQUID-DISPENSING APPARATUS.

Application filed October 17, 1925. Serial No. 63,033.

My invention relates to liquid-dispensing apparatus, and is found in means for preventing fraudulent operation.

In the accompanying drawings Fig. I is a view in elevation of gasoline-dispensing apparatus of familiar type, having my invention embodied in it. Fig. II is a view to larger scale, showing in section that portion of the structure in which my invention centers.

Referring, first, to Fig. I, the apparatus includes essentially a measuring chamber 1, borne upon a fixture such as may be set up at the curb-stone of a street or at other suitable place, and of a pump 2, by means of which gasoline may be drawn through a pipe-connection 3 from a suitable source of supply (commonly a buried tank), and delivered through a pipe connection 4 to the measuring chamber. A handle for operating the pump is indicated at 5. From the measuring chamber a discharge conduit 6 leads off, and this conduit is continued in the familiar delivery hose, of which the inner end is shown at 7. In the conduit 6 is arranged a valve casing 8, and the valve within the casing is shifted to open position by means of a crank arm 81. A conduit 9 connects the pipe connection 3 at the intake side of the pump with the valve casing 8, and the valve structure is such that the same swing of crank-arm 81 which unseats the delivery valve brings conduit 9 into communication with the discharge conduit. When the delivery valve within casing 8 closes again, the conduit 9 is closed. It follows that, so long as the delivery valve is open, the pump may not be operated, to drive more gasoline from the source of supply into the measuring chamber. As is usual in such an installation, a check-valve 31 is arranged in the line of flow from the source of supply through pipe connection 3 to the pump, and under all ordinary conditions of service the conduit 9 will be full of gasoline. It is apparent, then, that when the delivery valve is open, the only effect of pump operation will be to draw gasoline through conduit 9 and deliver it again to the measuring chamber. In other words, operation of the pump is futile, so long as the delivery valve remains open.

The apparatus, lacking the by-pass 9 whose position and function have been described, is susceptible to fraudulent operation. A dishonest attendant after opening the delivery valve may continue to pump, and so may deliver to a dishonestly favored customer more than the measured quantity of gasoline, and even with tally mechanism, the theft may be beyond detection. It will be apparent that with the by-pass added, the apparatus is not susceptible to such dishonest operation.

In Fig. II I show by way of example a valve structure such as is adequate to achieve the ends I have described. The valve includes two plates 82 and 83 which, swung transversely to the line of flow and in the general direction in which they themselves extend, alternately cut off and leave open the line of flow through conduit 6.

The valve casing is extended, as best shown in Fig. II, sufficiently to allow the plates 82 and 83 which together constitute the valve to be shifted from and to leave unobstructed the passage through conduit 6. By-pass 9 opens to the valve casing, and is conveniently arranged as shown in Fig. II, opening into the said extension. So long as the valve remains in the closed position shown in Fig. II, communication between conduit 6 and the by-pass is cut off; but when the valve is shifted into the extension, the proportions are such that there is communication around the shifted-aside valve plates, from conduit 6 to by-pass 9. When the valve is so shifted to open position any attempt to operate the pump will express itself merely in a suction through by-pass 9, in direction from conduit 6 (which now is open to the air) to the pump. It is not therefore possible for a dishonest attendant to open the valve and pump out gasoline unmeasured and unrecorded.

I claim as my invention:

1. In liquid-dispensing apparatus the combination of an elevated chamber, a delivery orifice from said chamber, a valve controlling said delivery orifice, a liquid-supply pipe leading to said chamber, a pump arranged in said liquid-supply pipe, a check valve arranged in said liquid-supply pipe on the intake side of said pump, and means effective on the opening of the said delivery valve for venting said liquid-supply pipe on the intake side of said pump and between said pump and check valve.

2. In liquid-dispensing apparatus the combination of an elevated chamber, a delivery conduit leading from said chamber, a valve casing in said conduit, a valve within said casing, a liquid-supply pipe leading to said chamber, a pump arranged in said liquid-supply pipe, a check valve arranged in said liquid-supply pipe on the intake side of said pump, a by-pass leading from said liquid-supply pipe on the intake side of said pump and between said pump and check valve, to said valve casing, said valve in its movement from closed to open position bringing said by-pass into communication with said delivery conduit.

In testimony whereof I have hereunto set my hand.

GEORGE W. MacKENZIE.